US009925789B2

(12) United States Patent
Choy et al.

(10) Patent No.: US 9,925,789 B2
(45) Date of Patent: Mar. 27, 2018

(54) REGULATOR COMPONENT

(71) Applicant: HEWLETT-PACKARD DEVELOPMENT COMPANY, L.P., Houston, TX (US)

(72) Inventors: Silam J Choy, Corvallis, OR (US); David Olsen, Corvallis, OR (US); Kevin E Swier, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/326,081

(22) PCT Filed: Jul. 25, 2014

(86) PCT No.: PCT/US2014/048216
§ 371 (c)(1),
(2) Date: Jan. 13, 2017

(87) PCT Pub. No.: WO2016/014077
PCT Pub. Date: Jan. 28, 2016

(65) Prior Publication Data
US 2017/0203578 A1    Jul. 20, 2017

(51) Int. Cl.
*B41J 2/175*    (2006.01)
*F16K 31/44*    (2006.01)

(52) U.S. Cl.
CPC ....... *B41J 2/17596* (2013.01); *B41J 2/17563* (2013.01); *F16K 31/44* (2013.01)

(58) Field of Classification Search
CPC .... B41J 2/175; B41J 2/17513; B41J 2/17596; B41J 2/17556; B41J 2/17563; B41J 2/19; F16K 31/44; F16K 31/00
USPC ..................... 347/6, 84, 85, 92, 93
See application file for complete search history.

(56) References Cited

U.S. PATENT DOCUMENTS

| 6,692,120 | B2 | 2/2004 | Yu et al. |
| 6,969,165 | B2 | 11/2005 | Olsen |
| 2003/0043242 | A1 | 3/2003 | Yu |
| 2008/0273071 | A1 | 11/2008 | Brown et al. |
| 2009/0109267 | A1 | 4/2009 | Lee et al. |
| 2009/0267976 | A1 | 10/2009 | Lee |
| 2011/0228018 | A1 | 9/2011 | Esdaile-Watts et al. |
| 2013/0050356 | A1 | 2/2013 | Stathem et al. |
| 2013/0194354 | A1 | 8/2013 | Petruchik et al. |

FOREIGN PATENT DOCUMENTS

| CN | 1374196 | 10/2002 |
| WO | WO 2011142742 A | 11/2011 |

*Primary Examiner* — Jannelle M Lebron
(74) *Attorney, Agent, or Firm* — HP Inc. Patent Department

(57) ABSTRACT

A regulator component includes a pressure regulator, a liquid filter, a vent with air filter downstream of the liquid filter, a second vent with air filter upstream of the liquid filter, and an outlet.

17 Claims, 5 Drawing Sheets

REGULATOR COMPONENT

BACKGROUND

Some printers occasionally ingest air either through printhead nozzles or through an ink supply inlet. Especially during shipment, when vibrations occur, or where printers are placed on the side, air ingestion may be hard to prevent. Also, once air is ingested it may be difficult to get the air out of the system. Certain measures can be taken to counter ingestion of air, such as filling printheads with shipment fluids prior to transport and de-airing of ink supplies. Any air already in the system may be purged or flushed out with ink or another liquid but this can result in large amounts of waste ink and early saturation of the medium that absorbs the waste ink.

BRIEF DESCRIPTION OF THE DRAWINGS

For the purpose of illustration, certain examples constructed in accordance with this disclosure will now be described with reference to the accompanying drawings.

DETAILED DESCRIPTION

In the following detailed description, reference is made to the accompanying drawings. The examples in the description and drawings should be considered illustrative and are not intended as limiting to the specific example or element described. Multiple examples can be derived from the following description and drawings through modification, combination or variation of the different elements.

In this disclosure regulator components are described. The regulator components, when installed, may be part of a high precision liquid dispense system, for example of a two dimensional or three dimensional print system to regulate a backpressure and liquid flow of the liquid dispense system. Suitable liquids for regulation by said regulator component include ink and three dimensional printing agents, respectively. In this description, "downstream" and "upstream" are related to a liquid flow direction. For example, the regulator component can regulate the flow of liquid to high precision printheads that have nozzle arrays of at least approximately 300 or at least approximately 600 nozzles per inch.

Figure 1:
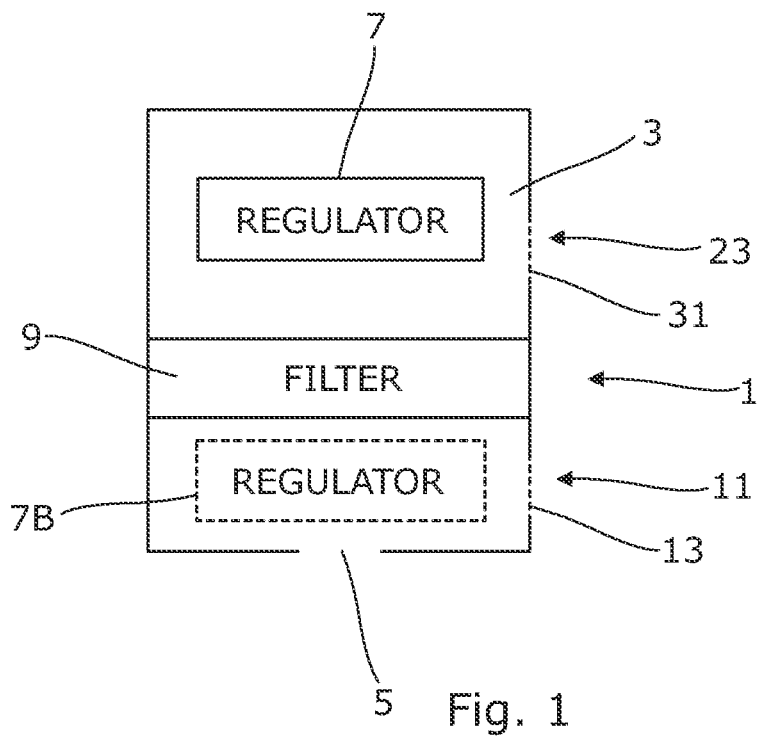
FIG. 1 illustrates a diagram of an example of a regulator component.

FIG. 1 illustrates an example of a regulator component 1. The regulator component 1 may include a liquid chamber 3 and at least one liquid outlet 5. The outlet 5 is to supply liquid to liquid channels downstream of the regulator component 1, such as manifold plates and a printhead. The liquid chamber 3 houses a pressure regulator 7 to regulate a backpressure in the liquid chamber 3. Amongst others, the regulator 7 may maintain a suitable low pressure in the liquid chamber 3 to prevent dripping of the liquid out of the printhead. To that end, the regulator 7 may include a flexible wall to adapt a volume of the liquid chamber 3, or a body of capillary channels (such as foam) that holds the liquid and provides for back pressure.

In the illustrated example the regulator component 1 includes a liquid filter 9 downstream of the pressure regulator 7. In another example, a regulator 7B can be arranged downstream of the liquid filter 9, as indicated by dotted lines. The liquid filter 9 may be housed in the liquid chamber 3, across the liquid chamber 3 to filter the liquid that flows from the liquid chamber to the outlet 5 to inhibit contamination of downstream liquid channels. The liquid filter 9 is to block solid or pasty particles from the liquid.

The regulator component 1 further includes a vent 11 downstream of the liquid filter 9. The vent 11 includes an air filter 13 that is air permeable and liquid impermeable, at least in an operational pressure range of the regulator component 1. Any air that is present in the printhead, manifold or in other liquid channels downstream of the liquid filter 9, is allowed to migrate into the regulator component 1 and escape through the vent 11, through the air filter 13. The air filter 13 prevents liquids from escaping. Having the vent 11 with air filter 13 downstream of the liquid filter 9 allows the air to escape without having to pass through the liquid filter 9. Sometimes, it is difficult for the air to pass through the liquid filter 9. For example when debris is caught in the liquid filter 9 it may be difficult for air to migrate through the filter 9. Hence, positioning the vent 11 with air filter 13 downstream of the liquid filter 9 facilitates air migration out of the system.

A second air vent 23 is positioned upstream of the liquid filter 9. The second air vent 23 includes a second air filter 31 that is air permeable and liquid impermeable, at least in an operational pressure range of the regulator component 1. The second air vent 23 provides for an escape route for air upstream of the liquid filter 9. For example, the second vent 23 may facilitate for venting air out of the liquid chamber 3. For example when ink flows into the liquid chamber 3 air is pushed out through the second vent 23 and thereby prevented from migrating to the further liquid channels or affecting a pressure.

Conveniently, the pressure regulator 7, the liquid filter 9 and the air vents 11, 23 are provided in a single regulator component 1, thereby providing for liquid regulation, liquid filtering and air venting in a single component 1 that can be readily installed in any print system as a single component 1 to regulate and supply liquid to the printhead, while keeping the printhead clean of debris and air during the further life of the print system. Having vents 11, 23 both downstream and upstream of the liquid filter 9 may allow for air to find a relatively easy way out of the print system, and it may allow for better air control on both sides of the liquid filter 9 throughout the print system. In one example the regulator component 1 is a liquid flow regulator that is to regulate flow of ink between an ink supply and a printhead. In another example the regulator component 1 is a replaceable ink supply that includes the regulator. In yet another example the regulator component 1 can be part of a lifetime ink supply system or a continuous ink supply system.

Figure 2:
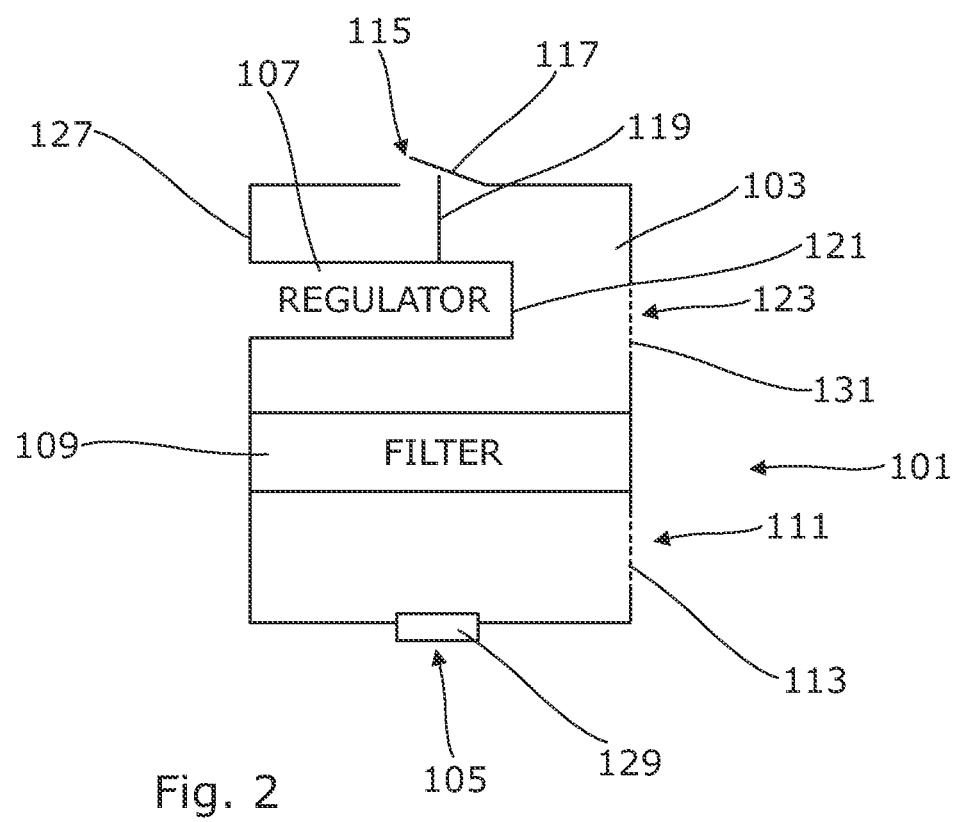
FIG. 2 illustrates a diagram of another example of a regulator component.

FIG. 2 illustrates another example of a regulator component 101. The regulator component 101 includes a substantially rigid housing 127. The housing 127 includes housing walls that define at least one liquid chamber 103. The housing walls may form an opening that defines a liquid outlet 105. The liquid outlet 105 may include a seal 129 to allow the outlet 105 to seal to a corresponding inlet, for example an inlet tube or a printhead manifold. The seal 129 may be a seal-ring to seal the outlet 105 to a further receiving liquid channel.

Figure 3:
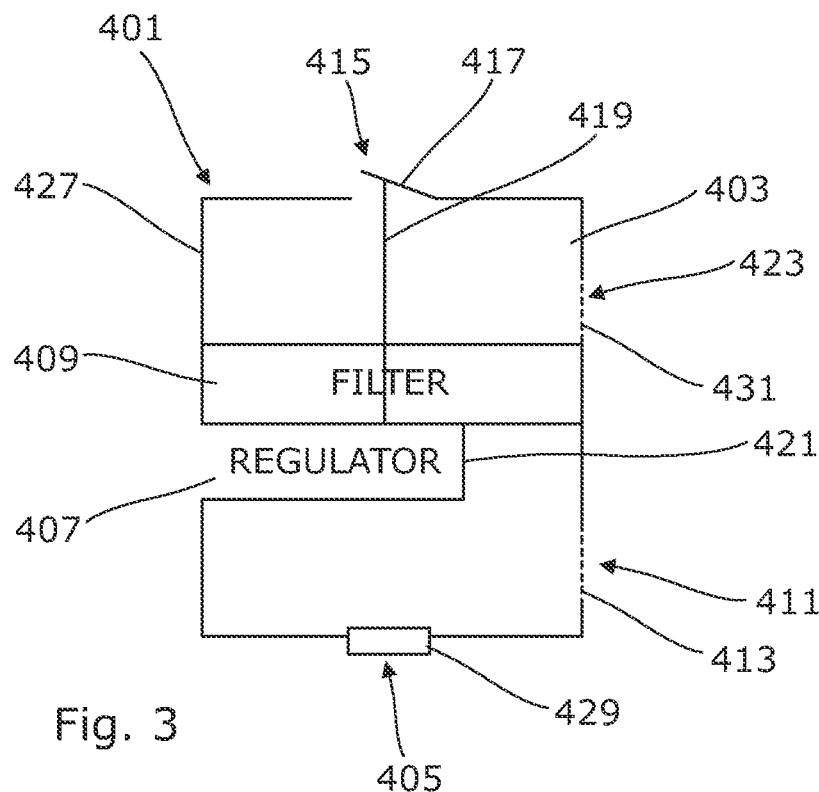
FIG. 3 illustrates a diagram of yet another example of a regulator component.
Figure 4:
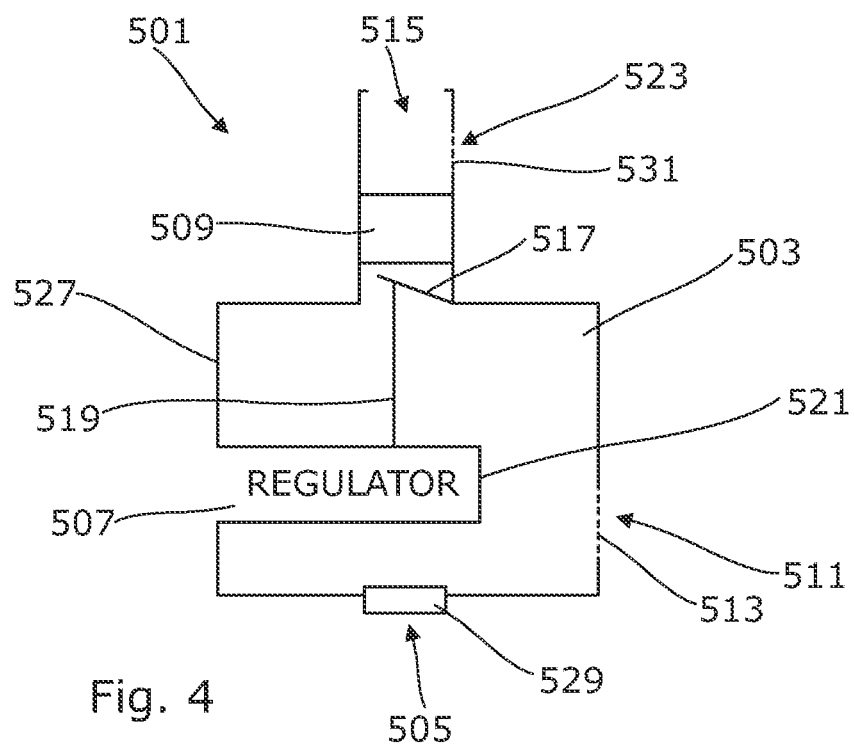
FIG. 4 illustrates a diagram of again another example of a regulator component.

The regulator component 101 includes a pressure regulator 107 that is disposed in the liquid chamber 103 to regulate the backpressure within the liquid chamber 103. The regulator 107 can include a flexible wall 121. The flexible wall 121 is to flex as a result of pressure changes in the liquid chamber 103 so that a pressure balance in the liquid chamber 103 can be maintained. A spring or elastomeric component (not shown) may bias the flexible wall to resist bulging into the liquid chamber 103 thereby providing for a continuous back pressure and inhibiting drooling of liquid out of the printhead. The flexible wall 121 can consist of suitable film material. The flexible wall 121 can be a bag that is to expand or collapse as a result of a pressure decrease or increase, respectively, in the liquid chamber 103, as illustrated in FIGS. 3 and 4. Such bag can provide for active or passive pressure control. The inside of the bag or the outside of the flexible wall 121 can be fluidically connected to ambient air or to a pump to expand and collapse, either passively by ambient air or actively by the pump.

The housing 127 includes a liquid inlet 115 to allow liquid to flow into the liquid chamber 103, for example from an upstream liquid chamber or liquid supply (not shown). The liquid inlet 115 includes a regulator valve 117. The valve 117 can be positioned against or onto the inlet 115. The valve 117 can be a ball valve that includes a ball and a seal disk or another suitable type of valve. When the valve 117 is closed, liquid is inhibited from flowing into the liquid chamber 103. When the valve is open, liquid is allowed to flow into the liquid chamber 103.

The valve 117 is mechanically connected to the flexible wall 121, for example through a lever 119, so that the valve 117 is actuated as a result of movement of the flexible wall 121. For example, when liquid flows out of the liquid chamber 103, the flexible wall 121 expands into the liquid chamber 103, so that the valve 117 is opened and liquid flows into the liquid chamber 103. When a certain amounts of liquid are added to the chamber 103, the flexible wall 121 is made to collapse again. The collapsing wall 121 actuates the valve 117 again, thereby closing the inlet 115. Said lever 119 may transfer the flexible wall movement to the valve 117. A fulcrum (not shown) may be provided to pivot the lever 119. The lever 119 may be biased by a spring to push the flexible wall 121 to a collapsed state, to provide for said continuous backpressure.

The regulator component 101 includes a liquid filter 109 in the liquid chamber 103 to filter out undesired particles from the liquid. Here, the liquid filter 109 is arranged downstream of the regulator 107, wherein the liquid filter 109 and the housing walls define the liquid chamber 103.

The regulator component 101 includes a first vent 111 downstream of the liquid filter 109. The vent 111 is to let air out downstream of the liquid filter 109. The vent 111 includes an air filter 113. The air filter 113 is air permeable and liquid impermeable, at least in an operational pressure range of the regulator component 1. The air filter 113 can be membrane structure. The air filter 113 may include a hydrophobic material or coating.

The regulator component 101 includes a second vent 123 that is disposed upstream of the liquid filter 109. The second vent 123 is to allow air upstream of the liquid filter 109 to exit. For example when filling the liquid chamber with liquid for a first time, air in the liquid chamber 103 may be displaced out of the chamber 103 through the second vent 123. The second vent 123 includes an air filter 131. The air filter 131 is air permeable and liquid impermeable, at least in an operational pressure range of the regulator component 1. The air filter 131 may be a membrane structure. The air filter 131 may include a hydrophobic material or coating. Having air vents 111, 123 both upstream and downstream of the liquid filter 109, in the regulator component 101, allows for effective air migration out of the system.

The single rigid housing 127 can be integrally molded. The molded housing 127 may define the inlet 115, outlet 105 and walls of the liquid chamber 103 to house the regulator component's subcomponents. For example, the flexible wall 121 and the air filters 113, 131 can be adhered, welded or staked to the rigid housing 127. The liquid filter 109 can placed in the housing 127, or otherwise attached inside the housing 127.

FIG. 3 illustrates another example of a regulator component 401. The regulator component 401 includes a substantially rigid housing 427 that defines at least one liquid chamber 403 and at least one liquid outlet 405. Like the example component 101 of FIG. 2, the component 401 of FIG. 3 can be installable in a printer for regulating ink or other liquids. The liquid outlet 405 may include a seal 429 to seal to a corresponding printer inlet.

The regulator component 401 of FIG. 3 includes a pressure regulator 407 that is disposed in the liquid chamber 403 to regulate the backpressure within the liquid chamber 403. The regulator 407 includes a flexible wall 421. A spring or elastomeric component (not shown) may bias the flexible wall to resist expansion of the flexible wall structure in the liquid chamber 403. The regulator 407 can provide for active or passive pressure control. For example, the flexible wall 421 may expand or collapse either passively by ambient air or actively by a pump.

The housing 427 includes a liquid inlet 415 and a regulator inlet valve 417. The valve 417 can be placed against the inlet 415. The valve 417 is mechanically connected to the flexible wall 421, for example through a lever 419, so that the valve 417 is actuated as a result of movement of the flexible wall 421, similar to the example of FIG. 2. A fulcrum (not shown) can be provided in the liquid chamber 403 may pivot the lever 419 to actuate the valve 417.

The regulator component 401 includes a liquid filter 409 in the liquid chamber 403 to filter out undesired particles from the liquid. The liquid filter 409 is arranged upstream of the regulator 407, thereby filtering the ink or other liquid that flows towards the regulator 407. The liquid filter 409 is arranged downstream of the inlet valve 417. In an example the mechanical connection 419 between the regulator 407 and valve 417 may pass through the liquid filter 409 or may bypass the liquid filter 409 to actuate the valve. In another example the flexible wall 421 and liquid filter 409 may extend alongside each other, wherein the liquid filter 409 is flexible or movable, so that when the flexible wall 421 flexes the liquid filter 409 flexes or moves, respectively, thereby actuating the valve 417.

The regulator component 401 includes a first vent 411 downstream of the liquid filter 409 to let air out downstream of the liquid filter 409. The vent 411 includes an air filter 413 that may be a membrane that is air permeable and liquid impermeable, at least in an operational pressure range of the regulator component 401. The membrane may include a hydrophobic material or coating. The regulator component 401 includes a second vent 423 that is disposed upstream of the liquid filter 409 to allow air upstream of the liquid filter 409 to exit. The second vent 423 may be a similar or equal structure as the first vent 411. The first and second vent 411, 423 may include a hole or tube through the housing wall whereby the air filter 413, 431 spans the hole or tube.

FIG. 4 illustrates another example of a regulating regulator component 501 similar to the examples of FIGS. 2 and 3. The regulator component 501 includes a substantially rigid housing 527 that defines a liquid chamber 503 and at least one liquid outlet 505 and that can be installed in a printer for supplying and regulating inks or other liquids. The liquid outlet 505 may include a seal 529 to seal to a corresponding printer inlet. The regulator component 501 includes a pressure regulator 507 that is disposed in the liquid chamber 503 to regulate the backpressure within the liquid chamber 503. The regulator 507 includes a flexible wall 521. A spring or elastomeric component (not shown) may bias the flexible wall 521 to resist expansion in the liquid chamber 503. The regulator 507 can provide for passive or active pressure control, for example passively with the aid of ambient air or actively with the aid of a pump, respectively.

The housing 527 includes a liquid inlet 515 and a regulator inlet valve 517. The valve 517 is mechanically connected to the flexible wall 521, for example through a lever 519, so that the valve 517 is actuated as a result of movement of the flexible wall 521, similar to the example of FIG. 2. A fulcrum (not shown) may pivot the lever 519 to actuate the valve 517.

The regulator component 501 includes a liquid filter 509 to filter undesired particles from the liquid. For example, the liquid filter 509 is disposed upstream of the liquid chamber 503. For example, the liquid filter 509 is arranged upstream of the inlet 545 and valve 517, thereby filtering the liquid before it flows into the liquid chamber 503 towards the regulator 507. In the illustrated example the liquid filter 509 is arranged in a tube-shaped inlet 515 but in other examples the liquid filter 509 may be arranged upstream of the liquid chamber inlet 515 in a wider chamber or channel, for example in a second liquid chamber upstream of the inlet valve 517 to allow for a wider spreading of particles that are caught in the liquid filter 509.

The regulator component 501 includes a first vent 511 downstream of the liquid filter 509 to let air out downstream of the liquid filter 509. The first vent 511 includes an air filter 513 that is air permeable and liquid impermeable, at least in an operational pressure range of the regulator component 501. The air filter 513 may be a membrane. The air filter 513 may include a hydrophobic material or coating. In the illustrated example the first vent 511 is disposed downstream of the inlet valve 517. The regulator component 501 further includes a second vent 523 that is disposed upstream of the liquid filter 509 to allow air upstream of the liquid filter 509 to exit. The second vent 523 may be similar or equal in structure as the first vent 511. Here, the second vent 523 is disposed upstream of the inlet valve 517 and liquid filter 509.

Figure 5:
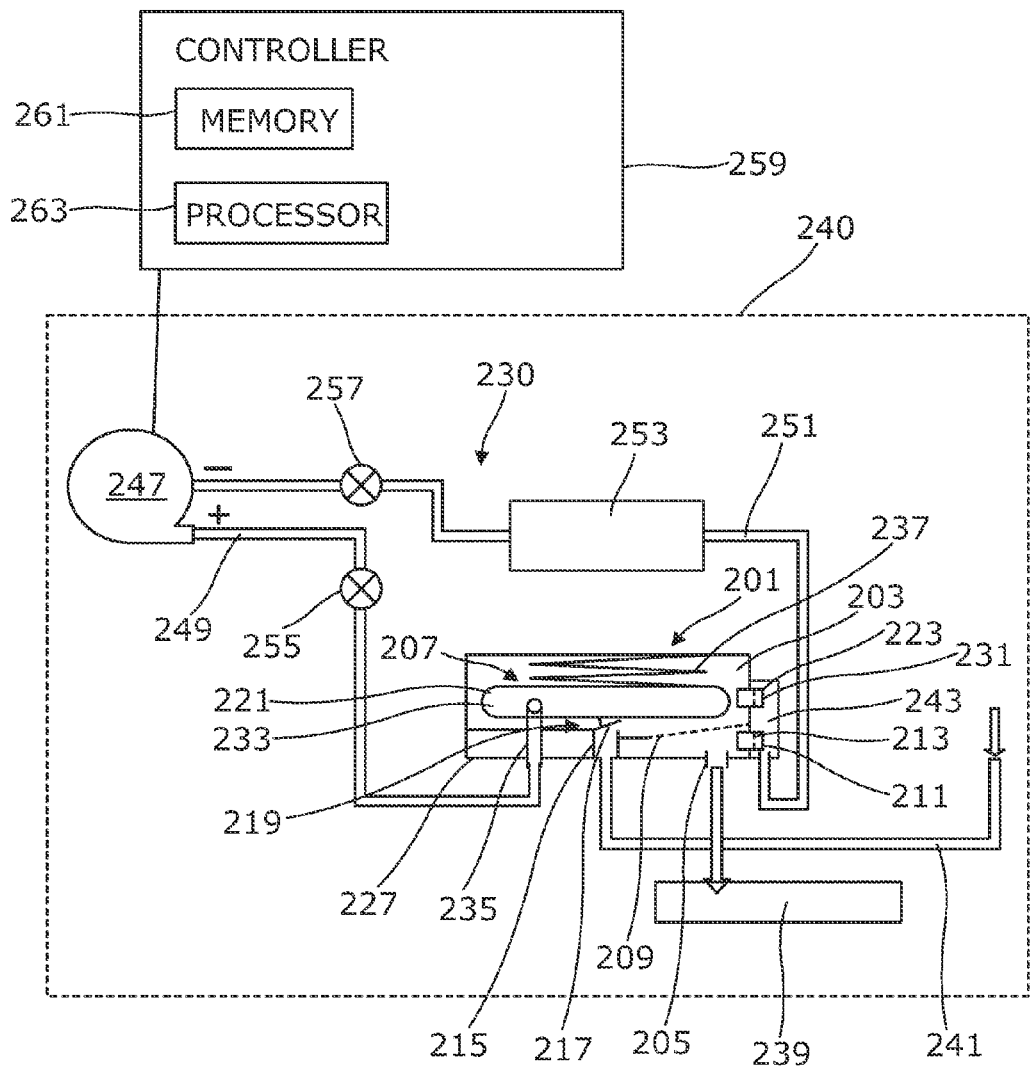
FIG. 5 illustrates a diagram of an example of a printer sub-assembly.

FIG. 5 illustrates an example of a subassembly 230 of a printer 240. The subassembly 230 includes a regulator component 201. The regulator component 201 includes a liquid chamber 203 to hold liquid. A pressure regulator 207 is disposed inside the liquid chamber 203. The regulator 207 includes an air bag 233 of a flexible film material 221, wherein the inside of the air bag 233 is fluidically connected to an air interface 235. The air bag 233 is to collapse and expand to maintain a desired pressure in the liquid chamber 205. The regulator 207 includes a spring 237 that exerts enough pressure to the bag 233 to provide for a continuous backpressure in the liquid chamber 203 and thereby prevent drooling of liquid out of a printhead assembly 239.

The regulator component 201 includes a liquid inlet 215 and a valve 217 that either seals or opens the inlet 215. The liquid inlet 215 is connected to a liquid supply channel 241 or directly to a liquid supply. Movement of the bag 233 actuates the valve 217 to open or close. The bag 233 may actuate the valve 217 directly or through a suitable mechanical connection 219 such as a lever and/or fulcrum. In the illustrated example, a certain expansion of the bag 233 may actuate the valve 217 to open the inlet 215 to allow liquid to flow in, while collapsing the bag 233 may actuate the valve 217 to close the inlet 215.

The regulator component 201 includes a liquid outlet 205 to supply liquid to a printhead assembly 239. For example, the printhead assembly 239 includes a fixed, page wide array of nozzles to dispense liquid over an entire page width. The regulator component includes a liquid filter 209 upstream of the outlet 205 to filter liquid that flows from the liquid chamber 203 to the liquid outlet 205.

The regulator component 201 includes a first vent 211 downstream of the liquid filter 209 to vent air downstream of the liquid filter 209. The regulator component 201 includes a second vent 223 upstream of the liquid filter 209 to vent air upstream of the liquid filter 209, for example out of the liquid chamber 203. The vents 211, 223 each include an air filtering membrane 213, 231 that is air permeable and liquid impermeable, at least in an operational pressure range of the regulator component 201. The vents 211, 223 may be connected to a common air source, for example through a common vent interface 243 and an air guide 251.

The illustrated regulator component 201 includes a housing 227 that houses or supports the regulator 207 and filtering parts 205, 213, 231. The housing 227 defines a liquid inlet 215 upstream of the regulator 207 and a liquid outlet 205 downstream of the regulator 207. For example the inlet 215 and outlet 205 are defined by tube-shaped structures that are integrally molded with the housing walls. The liquid inlet 215 and liquid outlet 205 may be substantially tube shaped to connect to a liquid supply and printhead, respectively. The housing 227 defines a second air vent 223 upstream of the liquid filter 209 and a first air vent 211 downstream of the liquid filter 209. For example the vents 211, 223 include holes through housing walls and/or tube-shaped structures that are integrally molded with the housing walls. The housing 227 further defines an air interface 235 to the inside of the bag 233 that may include a hole or channel through the housing wall and/or a tube-shaped structure. The air interface 235 and vents 211, 223 may be substantially tube shaped to connect to corresponding air guides 249, 251.

The printer subassembly 230 may include a pressure source such as a pump 247. In operation, the pump 247 is connected to the bag-air interface 235 through a first air guide 249. The pump 247 is to provide a positive pressure to the first air guide 249 to expand the bag 233. In one example the pump 247 is to apply a positive pressure to inflate the bag 233 and thereby open the valve 217 to allow for a relatively rapid fill of the liquid chamber 203. The pump 247 is connected to the vents 211, 223, through a common, second air guide 251, wherein the pump 247 is to produce a suitable suction effect through the second air guide 251. The second air guide 251 is connected to the vents 211, 223 through a common vent interface 243 that fluidically connects to both vents 211, 223. A vacuum reservoir 253 is connected to the second air guide 251. The pump 247 is connected to the vacuum reservoir 253 through the second air guide 251. The pump 247 regularly lowers the pressure in the vacuum reservoir 253 so as to stay under a desired pressure threshold. The vacuum reservoir 253 is to apply a suitable suction force to the vents 211, 223, enough to provide impetus for air to pass out of sub-assembly 230 through the respective air filters 213, 231 towards the vacuum reservoir 253.

The pump 247 is a positive and negative pressure air pump to both pressurize and evacuate air. The pump 247 and first air guide 249 are to provide a positive pressure to the bag 233 through the air interface 235. The pump 247 and the second air guide 251 are to provide a negative pressure to the vacuum reservoir 253 and vents 211, 223. To that end, the first air guide 249 is connected to a first check valve 255 between the pump 247 and the air-bag interface 235, while the second air guide 251 is connected to a second check valve 257 between the pump 247 and the vacuum reservoir 253.

In one example, a printer includes printer controller 259 to instruct the pump 247 to provide positive or negative pressure to the first or second air guide 249, 251, respectively. The controller 259 includes a digital memory 261 that stores instructions and a processor 263 to signal the pump based on the stored instructions. The digital memory 261 can be a non-volatile, non-transient memory. The controller 259 can include an application specific integrated circuit (ASIC). The controller 259 can include a digital and analogue ASIC. In one example, the controller 259 is to apply the negative pressure regularly at a predetermined frequency, to maintain the vacuum reservoir 253 below a desired pressure. In an example where the printer 240 is to be shipped without liquid, the controller 259 is to apply a relatively large positive and negative pressure during relatively long time ranges during a first printer start-up routine, to fill the system with relatively large amounts of liquid by hyper-inflating the bag 233 and to lower the pressure in the vacuum reservoir 253 to migrate relatively large amounts of air out of the system through the vents 211, 223. After the start-up routine during normal print operations the controller 259 may instruct the pump 247 to have a more moderate positive and negative pressure to control smaller amounts of liquid and air flow. Higher and lower pressures may be applied again during service routines.

Figure 6:
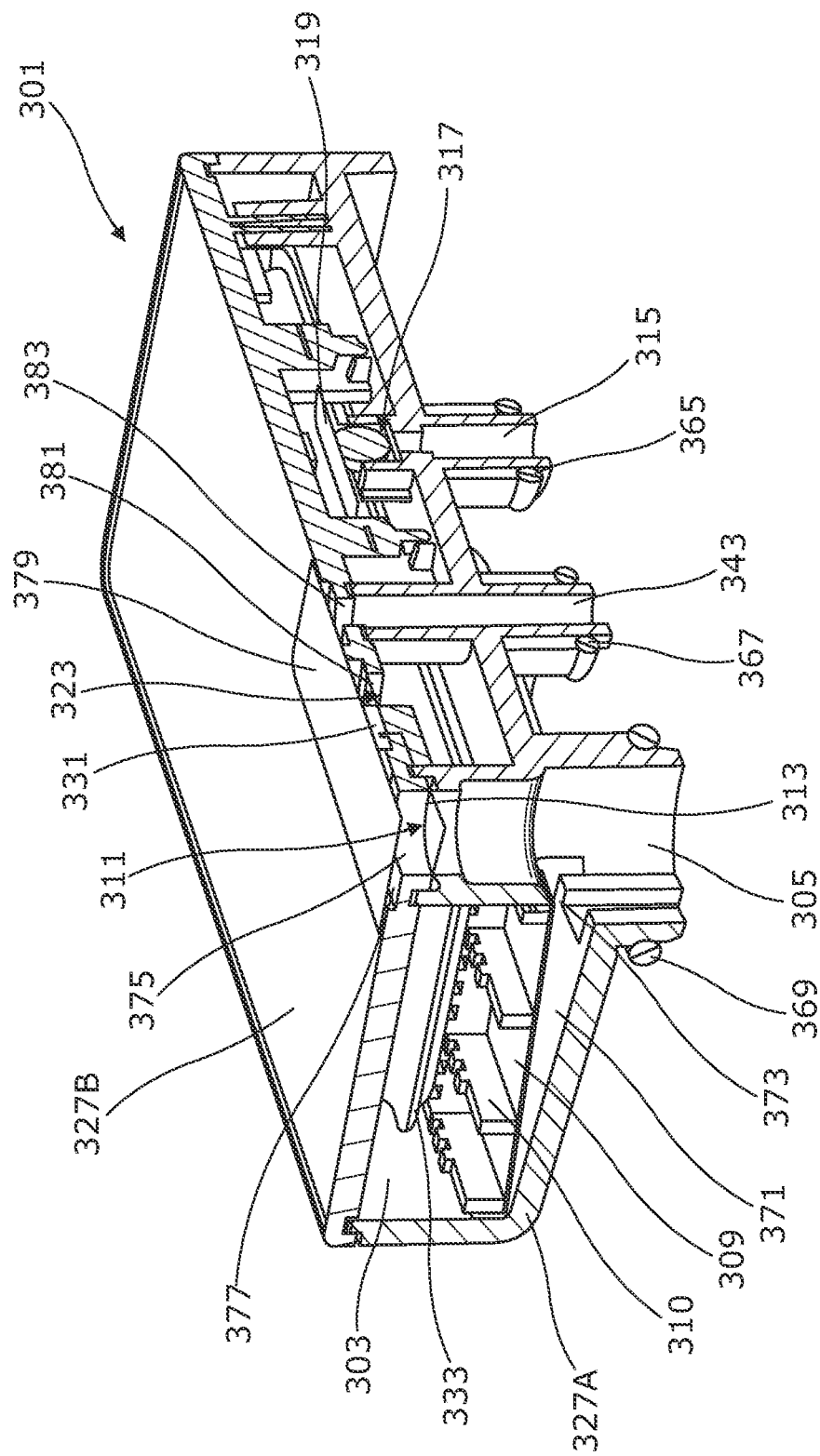
FIG. 6 illustrates an example of a regulator component in a cross sectional perspective view.

FIG. 6 illustrates another example of a regulator component 301 in a cross sectional perspective view. The regulator component 301 includes a housing. The housing may consist of molded, rigid plastic shells 327A, 327B. The housing includes a rigid first main shell 327A and a rigid second main shell 327B that are joined to form a single regulator component housing to enclose a liquid chamber 303 and sub-components. The liquid chamber 303 houses a back-pressure bag 333. The second main shell 327B can serve as a lid to be attached to the first main shell 327A, for example by adhering or welding. The second main shell 327B may be a substantially flat, rectangular and plate shaped structure while the first shell 327A may be a substantially rectangular and tray-shaped structure, permitting assembly of the sub-components to the housing. Together the shells 327A, 327B may provide for a box-like housing that is substantially rectangular and flat.

The first main shell 327A defines a liquid outlet 305, a liquid inlet 315 and a vent interface 343. The liquid outlet 305, liquid inlet 315 and vent interface 343 can be rigid and tube-shaped and can serve to interface with further liquid and air guides of the print system. The liquid inlet 315 may include a seal member 365 to fluidically connect to a liquid supply outlet while inhibiting liquid leakage so that liquid can be supplied to the liquid chamber 303. The vent interface 343 may include a seal member 367 to fluidically connect to a further air guide, vacuum reservoir and pump (not shown) while inhibiting air leakage. The liquid outlet 305 may include a seal member 369 to fluidically connect to further liquid channels while inhibiting leakage of liquid, for example liquid channels in manifold plates and/or a printhead assembly. Said seal members 365, 367, 369 may be ring shaped around and/or within each respective tube. The housing 327A, 327B includes a further air interface that connects the inside of the bag 333 with a further air guide (not shown). The further air guide may connect to a pump to inflate the bag 333.

The liquid inlet 315 may include a tube-shaped structure that is integral to the first main shell 327A. The tube may protrude outwardly to connect to a liquid supply outlet and inwardly into the liquid chamber 303. A valve 317 may be provided in the liquid chamber 303. The valve 317 may seal the liquid inlet 315 in a closed state and allow liquid to flow through in an open state. The tube of the inlet 315 may also protrude into the liquid chamber 303. The inward extending inlet tube may support and/or position the valve 317. The valve 317 may be a ball-disk seal valve or another suitable sealing valve. A mechanical connection may be provided between the valve 317 and a bag 333. For example, a lever 319 engages the valve 317 near one end. The lever 319 is mechanically connected to the bag 333 near an opposite end. Inflation of the bag 333 through the air interface (not shown) will actuate the valve 317 through the lever 319, allowing liquid to flow into the liquid chamber 303. The bag 333 may extend parallel to the second main shell 327B. The lever 319 and a spring that biases the lever and/or bag may be provided between the second main shell 327B and the bag 333.

A liquid filter 309 is provided between the liquid chamber 303 and the liquid outlet 305. The liquid filter 309 includes a liquid permeable sheet that has a suitable pore size to filter solids. A relatively rigid frame 310 can be provided to strengthen the filter 309. A plenum 371 extends between the filter 309 and the liquid outlet 305. A volume of the plenum 371 is defined by the housing walls and the liquid filter 309. The liquid outlet 305 is generally tube-shaped. The liquid outlet 305 protrudes outwards to open into a fluidically connected liquid inlet of a printhead assembly (not shown), and inwards, up to a first air vent 311. In the illustrated example, the liquid outlet 305 includes a third opening 373 through the tube shaped wall to allow liquid to flow between the plenum 371 and the outlet 305.

The first air vent 311 includes an air filter 313. The air filter 313 is a membrane. The air filter 313 extends across the tube to allow air to exit and prevent that liquid exits. Here, the first air vent 311 includes a hole 375 through the second main shell 327B. The second main shell 327B includes a vent interconnect 377 to guide air from the air filter to the vent interface 343. The vent interconnect 377 is also fluidically connected to a second air vent 323. The vent interconnect 337 may be formed by a cut-out in the outer surface of the second main shell 327B. An air tight seal film 379 is attached to the outer surface of the second main shell 327 over the cut out, to seal the vent interconnect 377.

The second air vent 323 extends through the second main shell 327B, between the vent interconnect 377 and the liquid chamber 303, facilitating exit of air out of the liquid chamber 303, to the vent interface 343. The second air vent 323 includes a second hole 381 through the second main shell 327B and an air filter 331.

The vent interface 343 includes a tube-shaped air guide that protrudes outwards from the first main shell 327A, and also through the liquid chamber 303, up to the second main shell 327B to connect to the vent interconnect 377. The second main shell 327B includes a third hole 383 into which the vent interface 343 opens. The third hole 383 opens into the vent interconnect 377 to fluidically connect the vent interface 343 with the vents 311, 323.

Figure 7:
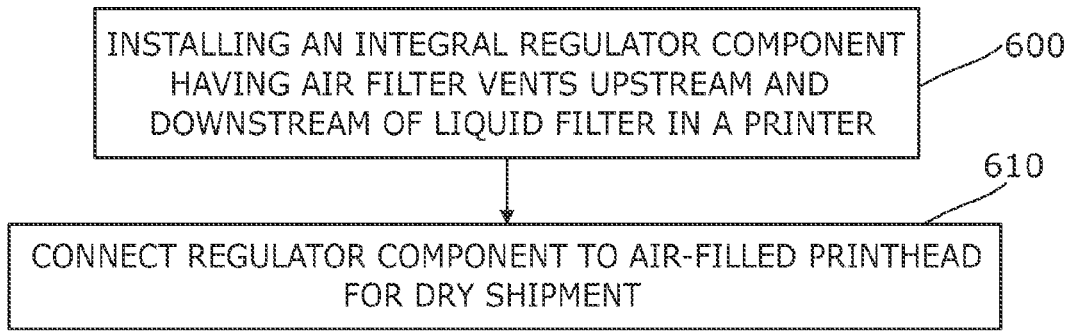
FIG. 7 illustrates a flow chart of a method of preparing a printer for shipment.

A flow chart of an example of a method of preparing a printer for shipment is illustrated in FIG. 7. The method includes installing an integral regulator component in a printer (block 600), wherein the regulator component may be one of the above described example regulator components that has air filter vents upstream and downstream of a liquid filter. For example the installation may take place when manufacturing the printer. The installation includes connecting the regulator component to an air-filled printhead for dry shipment (block 610). By connecting the regulator component to the printhead, all of its air and liquid regulating subcomponents are installed at the same time. Herein an air-filled printhead is a printhead that is substantially void of printing or shipping liquid. In an example the air-filled printer may include some unintended precipitated vapor or condensation drops. By using the regulator component for dry shipment, waste liquid may be reduced and shipment conditions may be made easier. For example, in page wide array printheads the reduction of waste liquid can be substantial, at least as compared to page wide array printheads that are shipped "wet", i.e. with a print or shipment liquid.

Figure 8:
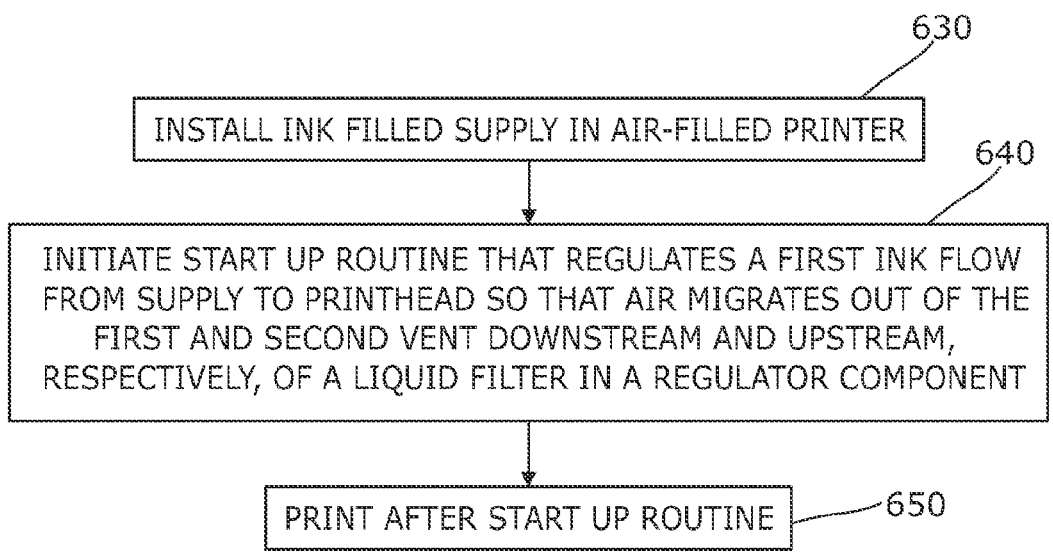
FIG. 8 illustrates a flow chart of an example of a method of using a printer for a first print job.

FIG. 8 illustrates a flow chart of an example of a method of using a printer that has the regulator component for a first print job, for example outside of a manufacturing plant. The method includes installing a liquid-filled supply into an air-filled printer (block 630). Here, an air-filled printer is a printer that is substantially void of printer or shipping liquid. In an example the air-filled printer may include some unintended precipitated vapor or condensation drops within its liquid channels. The method further includes initiating a start-up routine that regulates a first liquid flow from the first installed supply to the printhead so that air migrates out of the liquid channels and chambers through the first and second vent that are downstream and upstream, respectively, of a liquid filter of the regulator component (block 640). The start-up routine may include hyper inflating a regulator bag to rapidly fill the liquid channels and push air out of the channels and chambers, while applying suction to the vents to aid in air exit. The method may further include initiating printing of a print job after said start-up routine (block 650), for example using the same liquid of the same liquid-filled supply. Hence, the liquid that pushed air out through the vents is also used for printing, thereby minimizing waste liquids.

With some examples of this disclosure an initial ink fill of an ink supply need not be substantially airless and a printer need not be shipped with ink or shipment liquid. Air upstream of the liquid filter can exit through the second vent and its air filter. Air downstream of the liquid filter (e.g. in the printhead) can exit through the first vent and its air filter. When a printer is initialized for a first time, the regulator may draw liquid into respective liquid channels and chambers towards the printhead. Remainder air in the liquid chamber and channels can be displaced out through the second and first vents, respectively. In a further aspect, three functions that are generally associated with ink delivery systems in a printer, i.e. backpressure regulation, air management and ink filtration, can be combined into a single regulator component. The regulator component may be suitably installed in any printer to regulate the flow of liquids such as inks or three dimensional printing agents while allowing these printers to be shipped without liquids and fill at first start-up.

The regulator component can be a printer regulator that is a permanent or semi-permanent component of a printer. The regulator component can also be replaceable supply. In the supply, the liquid inlet can be provided between two liquid chambers, for example a buffer chamber and a regulator chamber that includes the regulator, the regulator chamber being disposed downstream of the buffer chamber to regulate flow of liquids into the regulator chamber using an inlet valve between the buffer chamber and the regulator chamber. In other examples, a replaceable supply can exclude a liquid inlet or a buffer chamber while still having a first and second vent, downstream and upstream of the liquid filter, respectively.

Different examples of regulator components may include different examples of air filters. For example the air filter can be a suitable labyrinth or wick that prevents that liquid passes through while allowing air to pass through. In certain examples instead of, or in addition to, air, other gasses may be evacuated from the liquid dispense system.

The invention claimed is:

1. A regulator component, comprising
a pressure regulator,
a liquid filter,
a first vent with a first air filter that is air permeable and liquid impermeable in an operational pressure range of the pressure regulator, the first vent located downstream of the liquid filter,
a second vent upstream of the liquid filter, and
a liquid outlet downstream of the liquid filter.

2. The regulator component of claim 1 wherein the second vent includes a second air filter that is air permeable and liquid impermeable in an operational pressure range of the pressure regulator at least one of the air filters comprises a membrane.

3. The regulator component of claim 1 wherein the vents vent through a common vent interface.

4. The regulator component of claim 1 wherein a to-be-regulated liquid is ink.

5. The regulator component of claim 1 comprising a single housing for installation into a larger print system, wherein the single housing houses the pressure regulator, liquid filter and air filters.

6. The regulator component of claim 5 wherein the single housing defines vent holes of the vents and the liquid outlet.

7. The regulator component of claim 5 wherein the housing is formed by at least two fitting rigid shell parts.

8. The regulator component of claim 1 comprising a liquid chamber housing the regulator and a liquid inlet to the liquid chamber.

9. The regulator component of claim 8 wherein the regulator comprises a flexible wall and a liquid inlet valve of the liquid inlet, the valve being mechanically connected to the flexible wall, wherein the flexible wall is to
flex in response to a pressure change in the regulator chamber, and
actuate the inlet valve through the mechanical connection.

10. A printer sub-assembly comprising
the regulator component of claim 1, and
a vacuum reservoir connected to the vents.

11. The printer sub-assembly of claim 10 that is filled with air.

12. A printer sub-assembly comprising
the regulator component of claim 1, and
a page wide array printhead fluidically connected to the regulator component outlet.

13. A regulator component to connect to a printhead, comprising a housing defined by walls,
a liquid chamber defined by the housing walls,
a pressure regulator in the liquid chamber,
a liquid filter in the housing,
an outlet in the housing, downstream of the liquid filter,
a first vent in the housing, downstream of the liquid filter, and
a second vent in the housing, upstream of the liquid filter.

14. The regulator component of claim 13 comprising an inlet to the liquid chamber and an inlet valve to control liquid flow out of the inlet to the chamber, the inlet valve being arranged upstream of the regulator.

15. The regulator component of claim 13, comprising a first air filter to filter air passing through the first vent, the first air filter being air permeable and liquid impermeable in an operational pressure range of the pressure regulator.

16. The regulator component of claim 15, comprising a second air filter to filter air passing through the second vent, the second air filter being air permeable and liquid impermeable in an operational pressure range of the pressure regulator.

17. A printer system comprising the component of claim 13 comprising
a negative and positive air pressure pump,
a regulator bag connected to the pump, and
the vents connected to the pump.

* * * * *